United States Patent [19]
Hedrick

[11] 4,024,705

[45] May 24, 1977

[54] ROTARY JET REACTION TURBINE

[76] Inventor: Lewis W. Hedrick, Woodland Hills, Calif. 91364

[22] Filed: Apr. 14, 1975

[21] Appl. No.: 568,116

Related U.S. Application Data

[63] Continuation of Ser. No. 433,363, Jan. 14, 1974, abandoned, and a continuation-in-part of Ser. No. 179,671, Sept. 13, 1971, abandoned, and Ser. No. 345,233, March 26, 1975, abandoned, said Ser. No. 179,671, is a continuation-in-part of Ser. No. 134,574, April 16, 1971, abandoned.

[52] U.S. Cl. .......................... 60/39.16 C; 60/39.35
[51] Int. Cl.² ......................................... F02C 3/16
[58] Field of Search ........ 60/39.34, 39.35, 39.16 C, 60/39.58, 39.16 R, 39.16 S; 415/80, 63, 81; 416/21

[56] References Cited

UNITED STATES PATENTS

| | | | |
|---|---|---|---|
| 1,186,950 | 6/1916 | Seguin | 60/39.34 |
| 2,594,629 | 4/1952 | Exner | 60/39.35 |
| 2,594,788 | 4/1952 | Morain | 60/39.35 |
| 2,596,276 | 5/1952 | Napoli | 415/80 |
| 2,612,021 | 9/1952 | Zuhn | 60/39.35 |
| 2,840,341 | 6/1958 | Hudyma | 415/63 |
| 2,994,195 | 8/1961 | Carswell | 60/39.35 |
| 3,005,311 | 10/1961 | Ross | 60/39.35 |
| 3,200,588 | 8/1965 | Math | 60/39.35 |
| 3,557,551 | 1/1971 | Campbell | 60/39.16 |

FOREIGN PATENTS OR APPLICATIONS 934,755  1/1948  France .............................. 60/39.35

OTHER PUBLICATIONS

Cox, Harold R., Gas Turbine Principles and Practice, N.Y., Van Nostrand Co., Inc., pp. 15-13—15-14, 1955.

Primary Examiner—Carlton R. Croyle
Assistant Examiner—L. J. Casaregola
Attorney, Agent, or Firm—Whann & McManigal

[57] ABSTRACT

A jet type engine includes a rotor through which air is drawn and compressed by centrifugal force with the air thus heated and compressed being mixed at the periphery of the rotor with fuel to ignite the same and establish a jet which causes the rotor to rotate. In some cases the air may be precompressed prior to its delivery to a hollow shaft from which it travels radially outwardly through hollow spokes for compression and heating prior to its mixture with fuel that is introduced through a small tube extending through a corresponding one of such hollow spokes. The resulting combustion gases are directed through guides onto turbine buckets on a second rotor which rotates in a direction opposite to that of the air and fuel conducting rotor and the exhaust gases are discharged in a direction extending parallel to the axis of rotation, i.e., sideways. A common output shaft is coupled to these two oppositely rotating rotors for powering, for example, an automobile with energy derived from both such rotors.

20 Claims, 30 Drawing Figures

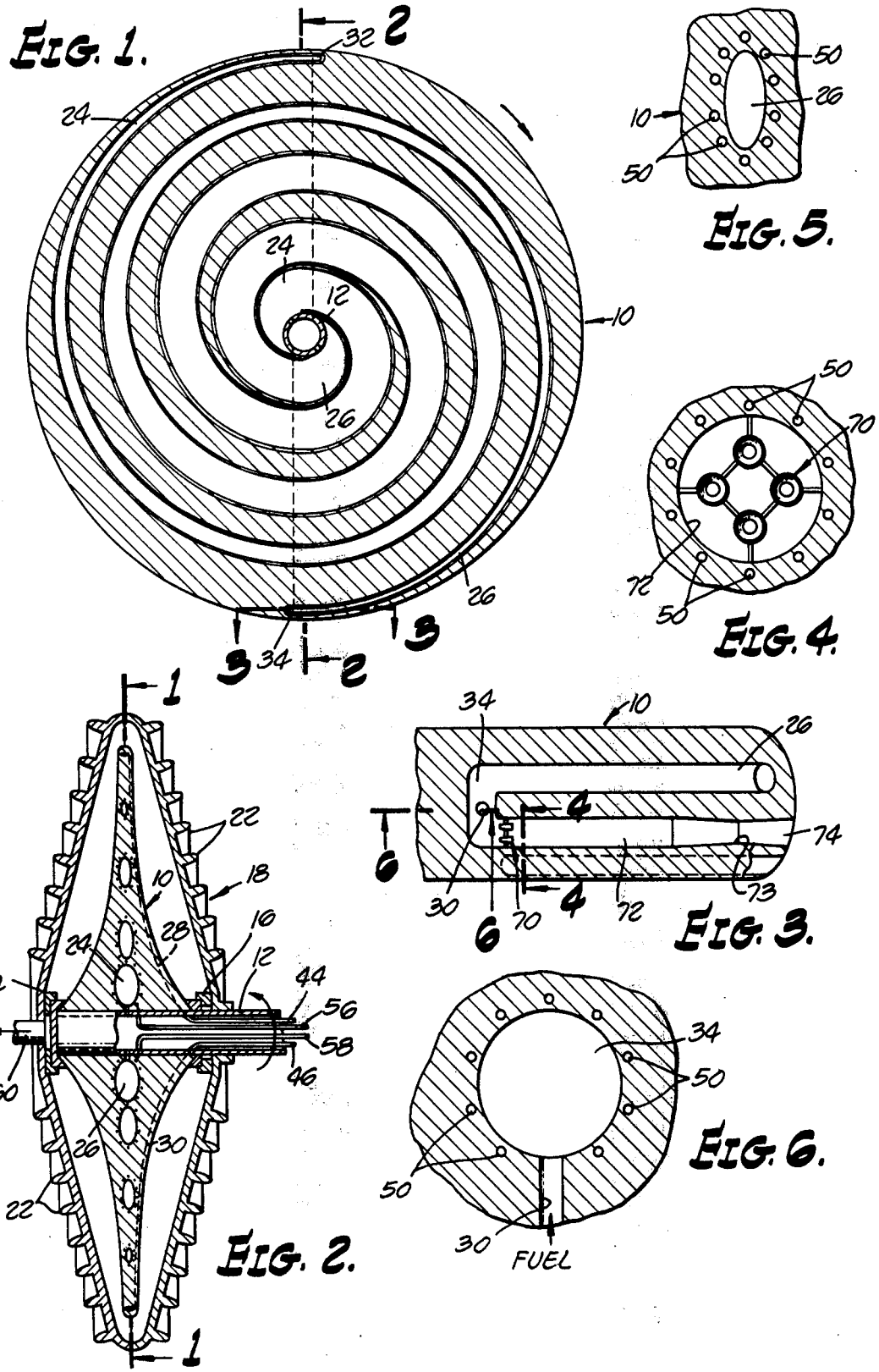

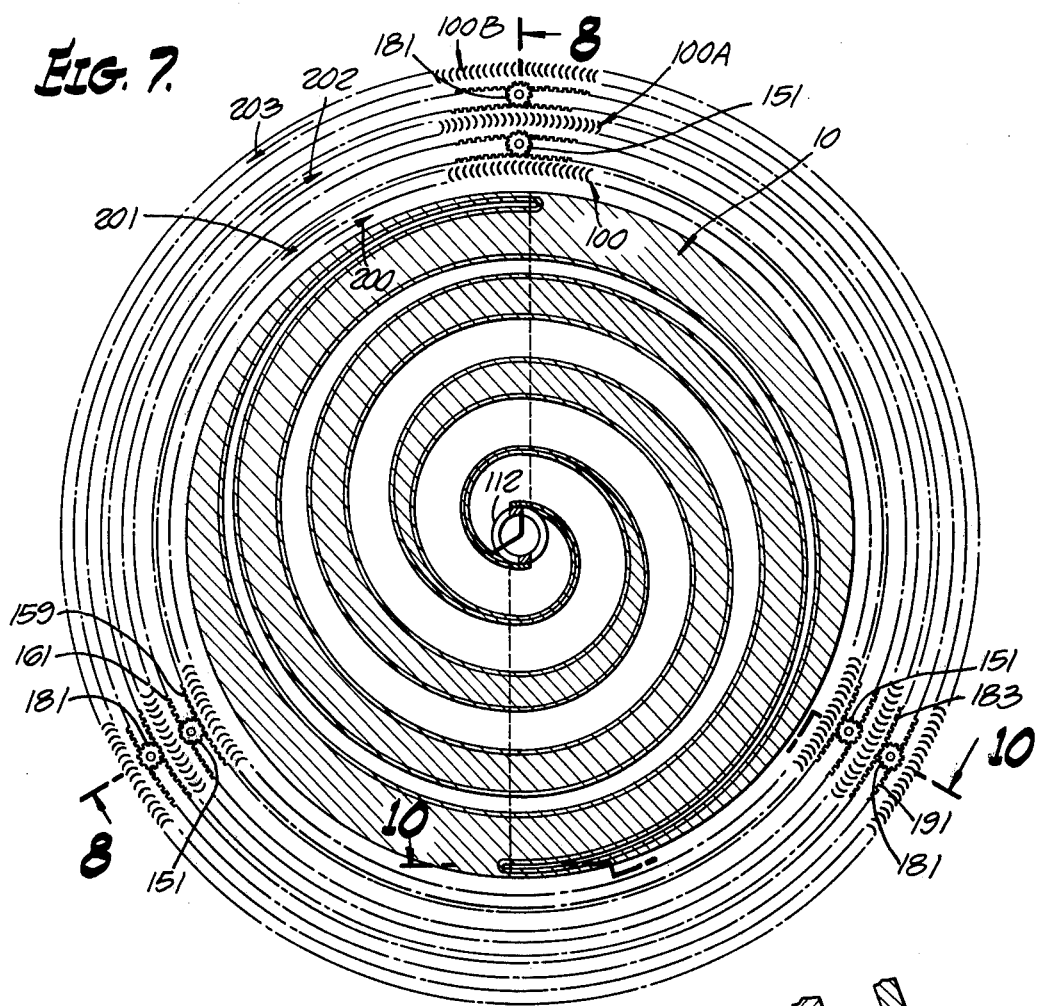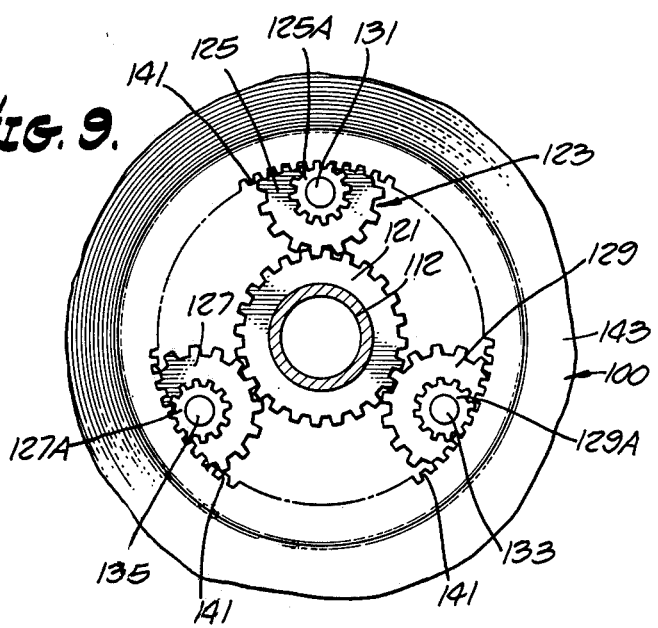

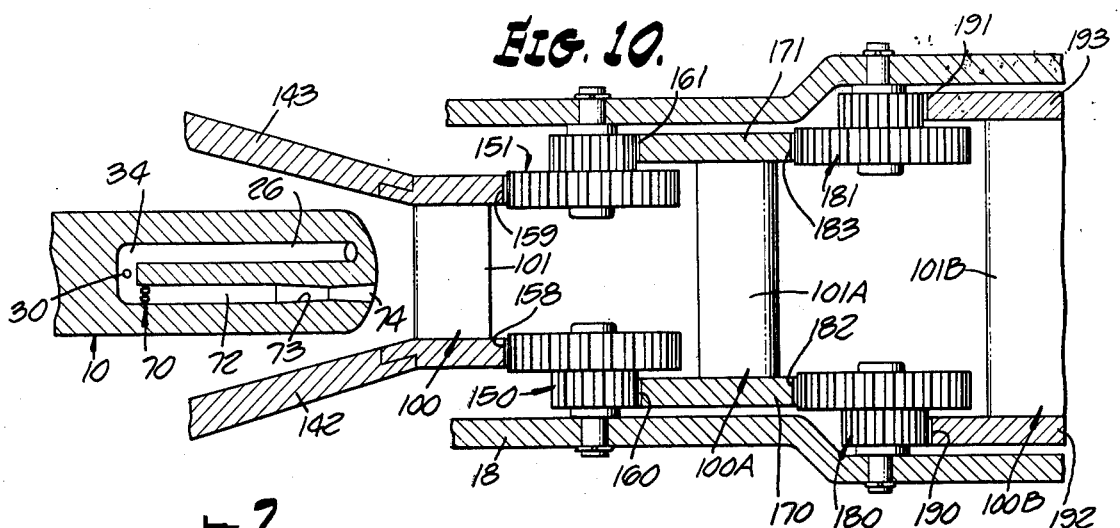

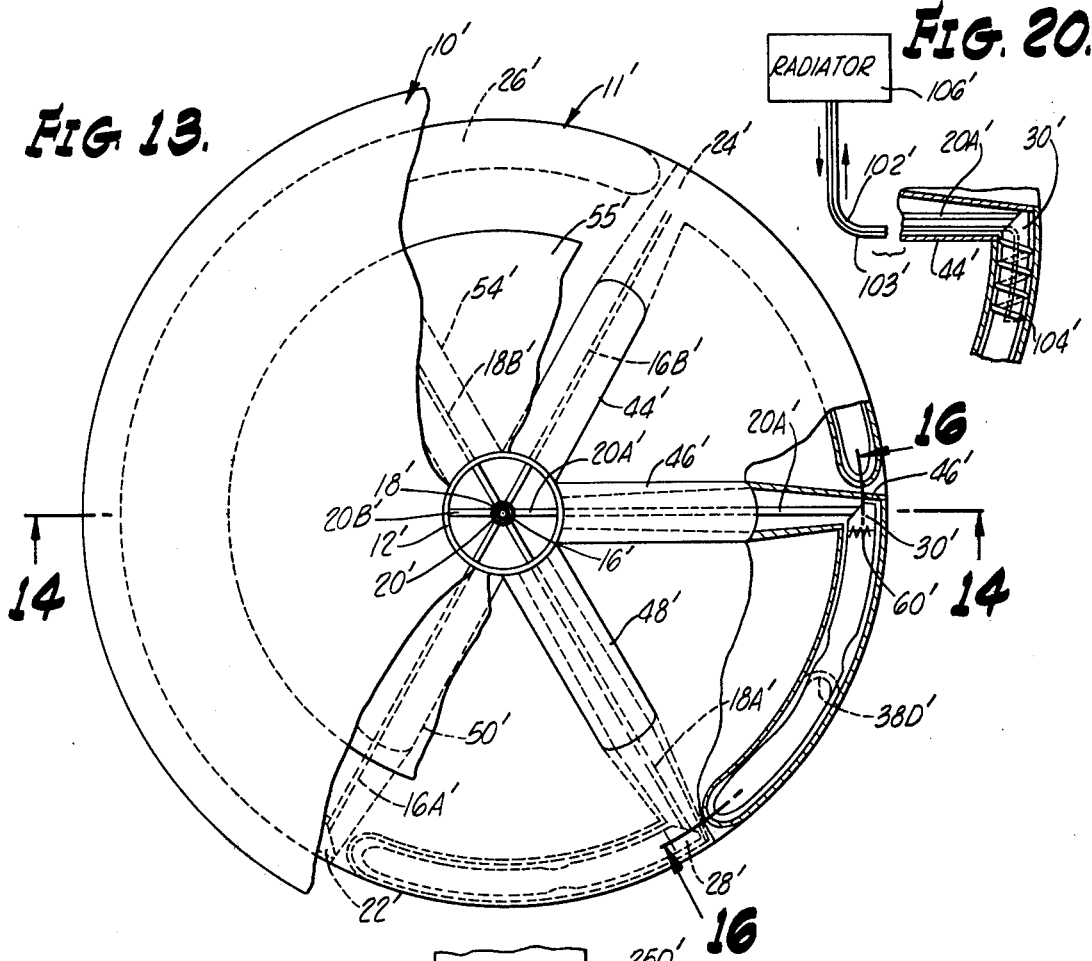
FIG. 13.
FIG. 20.
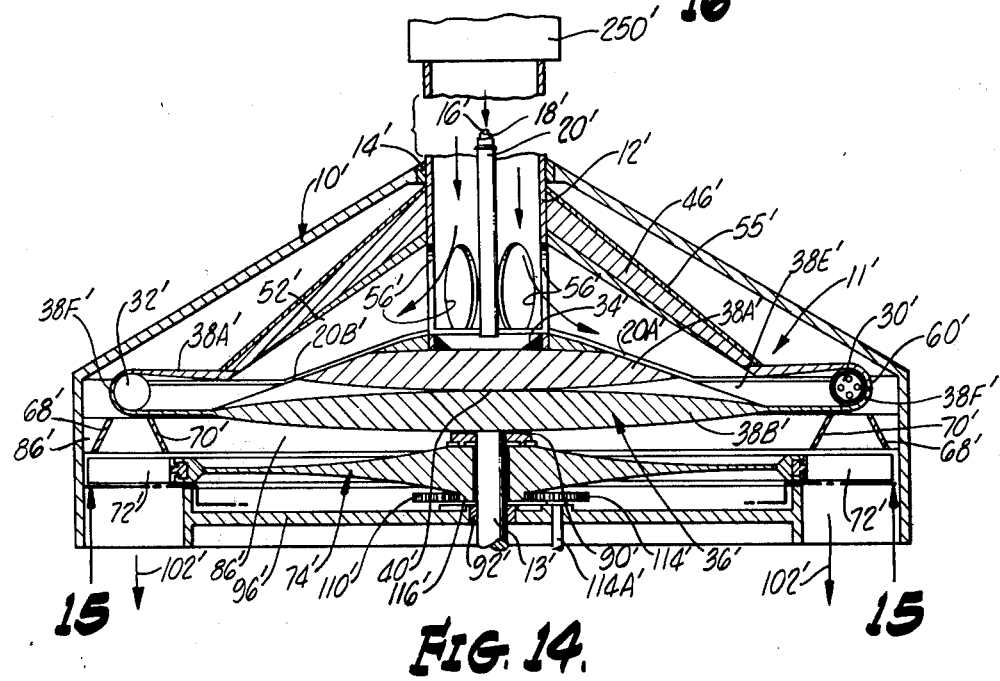
FIG. 14.

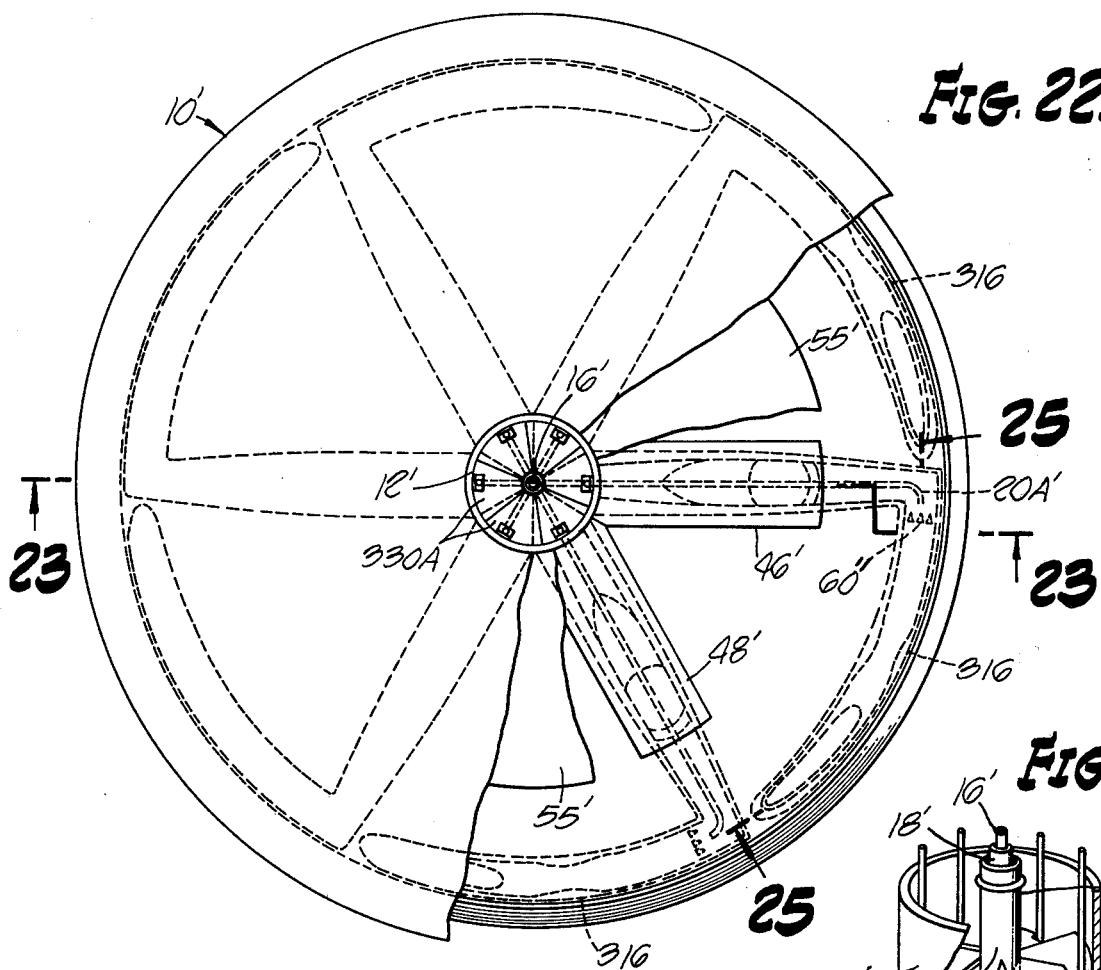
FIG. 22.
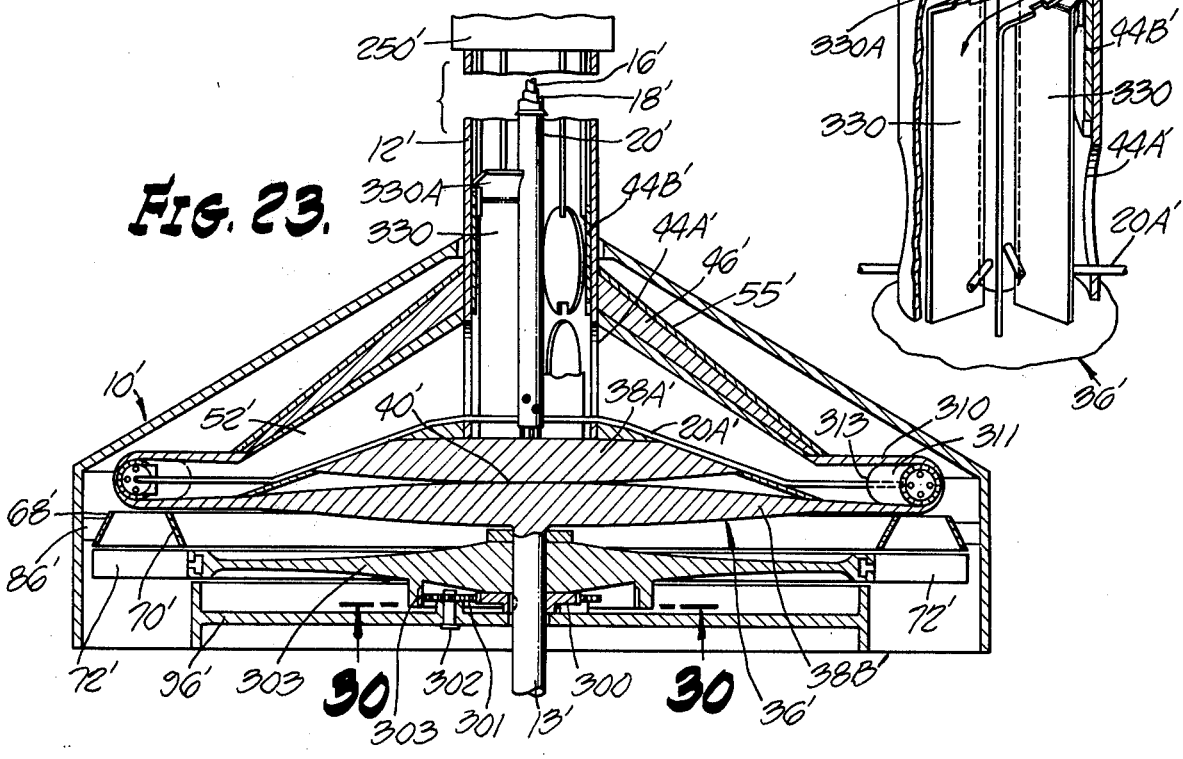
FIG. 24.
FIG. 23.

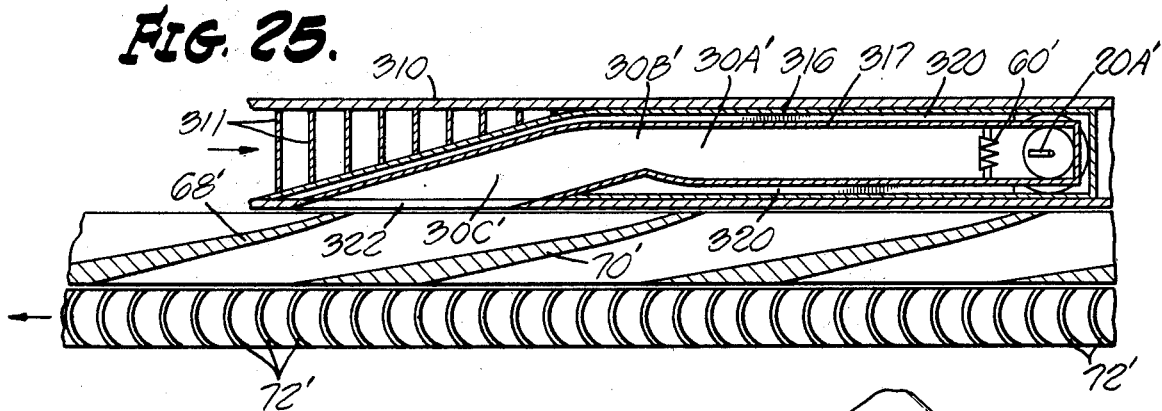
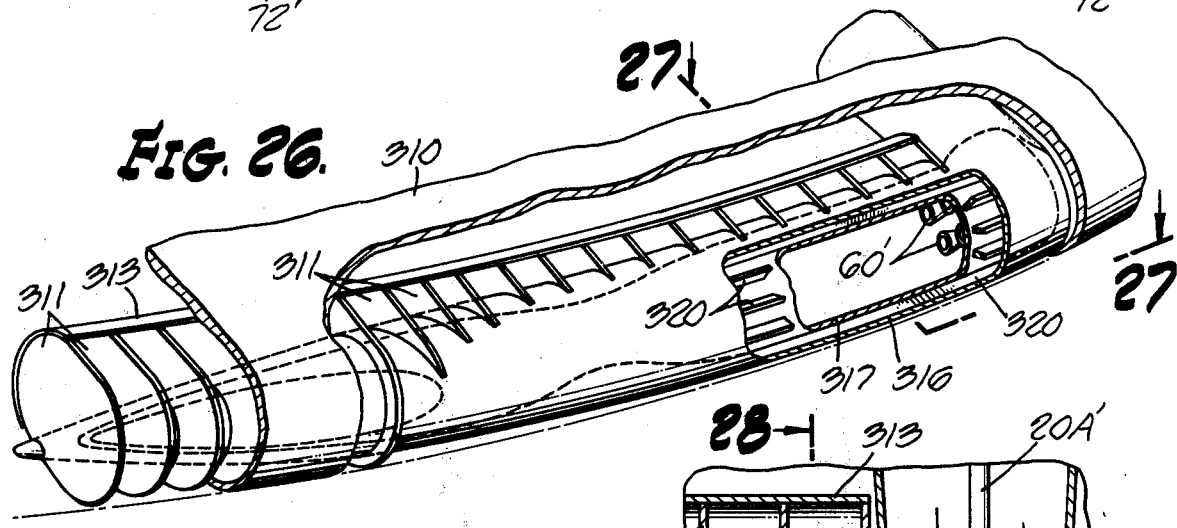
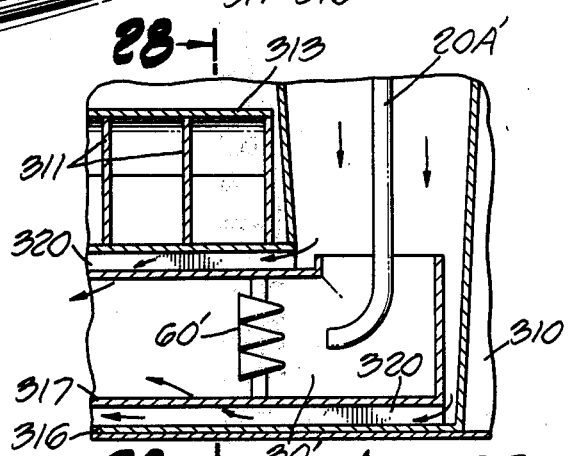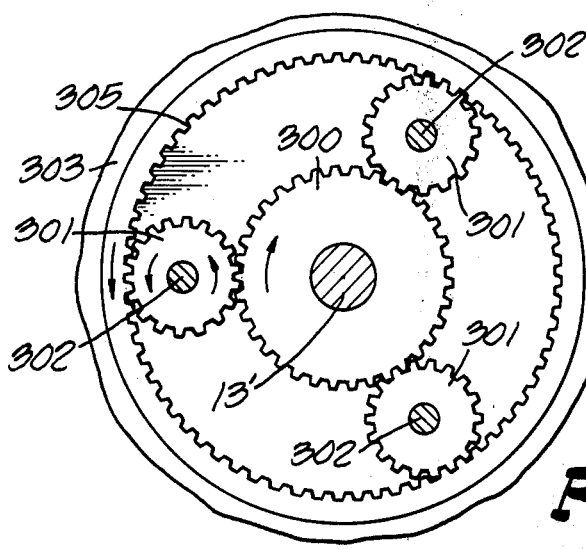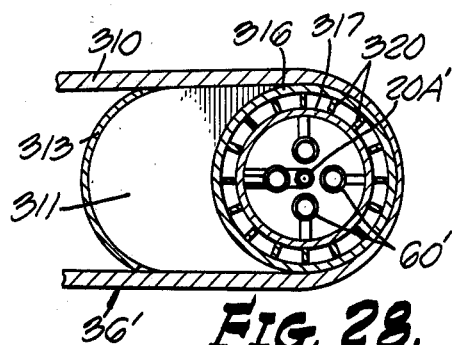

ROTARY JET REACTION TURBINE

This is a continuation of application Ser. No. 433,363, filed Jan. 14, 1974 (now abandoned). The present application is also a continuation-in-part of my two pending U.S. applications, Ser. No. 179,671 filed Sept. 13, 1971, (now abandoned) and Ser. No. 345,233 filed Mar. 26, 1973, (now abandoned), said application Ser. No. 179,671 being a continuation-in-part of my U.S. application Ser. No. 134,574, filed Apr. 16, 1971 (now abandoned).

The present invention relates to an improved engine.

A specific object of the present invention is to provide a jet type engine in which a particular action is accomplished by a jet stream at the periphery of a rotor having an output shaft.

Another specific objection of the present invention is to provide an improved jet type engine in which the rotor serves to compress air and heat it to a temperature sufficiently high to cause ignition of the fuel also introduced into the rotor.

Another specific object of the present invention is to provide an improved jet type engine in which a rotor is of unique construction involving involute type passages of decreasing cross section such that air introduced into the center of the rotor is caused to be compressed by centrifugal force to heat the same to a temperature sufficiently high to ignite fuel also introduced into the rotor through a separate passageway in the rotor.

Another specific object of the present invention is to provide a jet type engine as set forth in the preceding paragraphs in which the jet leaving the main rotor impinges on turbine type blades on a supplemental rotor to cause it to rotate with the main rotor in a common casing.

Another specific object of the present invention is to provide an improved jet type engine in which a particular action is accomplished at the periphery of a rotor having an output shaft.

Another specific object of the present invention is to provide an improved jet type engine in which the rotor serves to compress air and heat it to a temperature sufficiently high to cause ignition of the fuel also introduced into the rotor.

Another specific object of the present invention is to provide an improved jet type engine in which a rotor is of unique construction involving radially extending passages of decreasing cross section such that air introduced into the center of the rotor is caused to be compressed by centrifugal force to heat the same to a temperature sufficiently high to ignite fuel also introduced into the rotor through fuel lines also extending through such passages.

Another object of the present invention is to provide an engine of this character in which the exhaust gases are exhausted in a direction which may be termed sideways, i.e., in a direction extending generally parallel to the axis of rotation.

Another object of the present invention is to provide an engine of this character having improved efficiency.

Another object of the present invention is to provide an engine of this character in which the air may be precompressed to such high temperature that water cooling of the air conduits and/or combustion chamber may be required. Such water cooling may be accomplished using water which is recirculated through a cooling radiator using centrifugal forces developed on the water as it is being conducted through channels which extend generally parallel to the radially extending air channels and in good heat conducting relationship thereto and through a cooling coil which may encircle the combustion chamber for purpose of cooling it.

Another object of the present invention is to provide an engine of this character wherein the fuel to individual combustion chambers may be conveniently adjusted.

Another object of the present invention is to provide an improved engine of this character adapted to receive precompressed air so that the ultimate pressure is determined jointly by precompression and by centrifugal force.

Another object of the present invention is to provide an engine of this character incorporating a rotor wherein the air to individual combustion chambers may be conveniently adjusted.

Another object of the present invention is to provide an improved rotor construction which involves radial air conduits contributing to a simple compact design.

Another specific object of the present invention is to provide an engine of this character which incorporates an impulse rotor operating in conjunction with a turbine, the turbine having buckets upon which the exhaust gases from the jet engine impinge, the exhaust gases for this purpose being directed in an axial direction, i.e., in a direction generally parallel to the common axis of motion of the rotor and turbine.

Still another object of the present invention is to provide an improved jet engine which incorporates improvements teaching that the combustion support conduits may extend radially so that a greater number of the same may be provided than is the case when such passageway is of tortuous or volute nature.

Still another object of the present invention is to provide an improved jet engine in which the rotor involves two disc like elements secured together with one of such disc like elements being apertured near its periphery to allow passage of air through it. These disc like elements are thicker at their center than at their peripheral portions to achieve manufacturing advantages, compactness and large ratio of horsepower output to weight.

The engines described involve the use of principles of jet propulsion and gas turbines. Jets exhausting tangentially at the periphery of a rotor disc provide the torque for a power take-off shaft at the axis of the rotor. The jet exhaust from the first rotor is directed through impulse turbine blades of a second rotor which is coupled to the same power take-off shaft. A large thermal overall efficiency is attained by virtue of the high initial temperature of the cycle. The fuel can be any one of a wide variety of conventional, inexpensive fluids.

The Power is derived principally from the jet reaction; therefore, only the combustion chamber is in contact with the hot gases at their initial highest temperature. The highest temperature parts may be small in physical size. Essentially, the engine has only two moving parts each coupled to the same output shaft about which they rotate.

More specifically, air is drawn in to the center hub of a rotor disc; it is compressed by centrifugal force as it moves to the periphery; fuel is introduced at the periphery; and the mixture is fired by the heat of the compressed air. The burned gases pass through a nozzle to accelerate them to a speed greater than the disc's peripheral velocity, and they are discharged tangentially to impart torque to the rotor by their reactive force. The jet exhaust is then directed onto convave turbine blades attached to the periphery of a second rotor which is thus rotated contra to the first rotor by the impulse force of the gases. The two rotors are coupled to the same output shaft about which they rotate. Much higher temperatures and efficiencies are possible with this engine than conventional turbines because the heat is utilized in generating a high speed jet — relative to the rotor — which is converted to shaft horsepower; and only the residual jet, which is a much lower speed, is "felt" by the impulse turbine blades. Therefore, the stagnation temperature is well below current permissible design practice.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 is a sectional view taken through the rotor shown in FIG. 1 and as indicated by the line 1—1 in FIG. 2.

FIG. 2 is a sectional view taken as indicated by the line 2—2 in FIG. 1.

FIG. 3 is a sectional view taken substantially as indicated by the line 3—3 in FIG. 1.

FIG. 4 is a sectional view taken substantially as indicated by the line 4—4 in FIG. 3.

FIG. 5 illustrates in enlarged form a portion of the rotor structure shown in FIG. 2.

FIG. 6 is a sectional view taken substantially as indicated by the line 6—6 in FIG. 3.

FIG. 7 is a view like FIG. 1 but of a modified construction and corresponds to a view taken on line 7—7 of FIG. 8.

FIGS. 8 and 10 are views taken as indicated by the lines 8—8 and 10—10 respectively in FIG. 7.

FIG. 9 is a view taken as indicated by line 9—9 in FIG. 8.

FIG. 11 illustrates in enlarged form some of the structure shown in FIG. 7, and FIG. 12 illustrates a modification.

Figure 15:
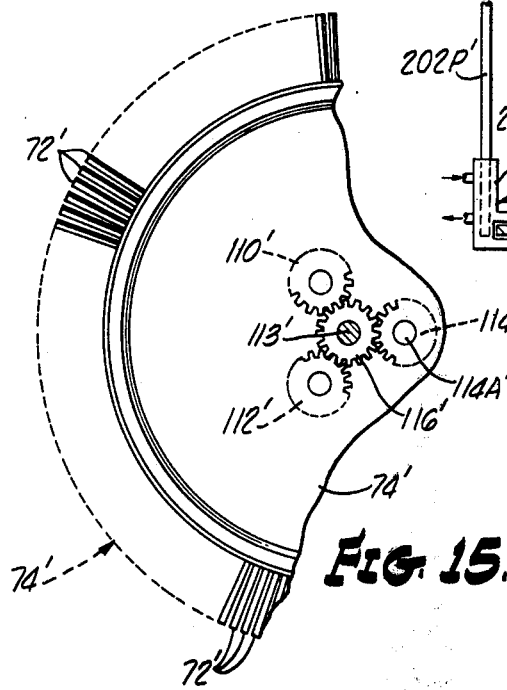
Figure 21:
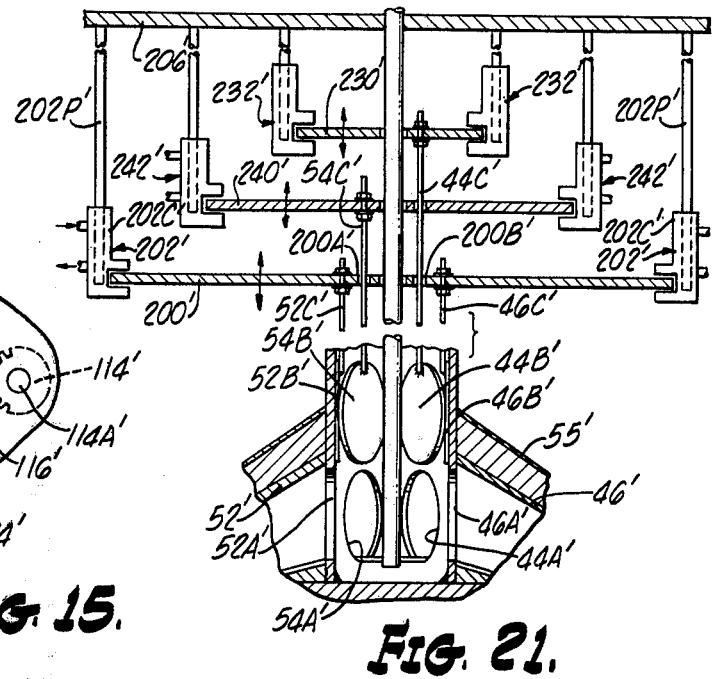
Figure 16:
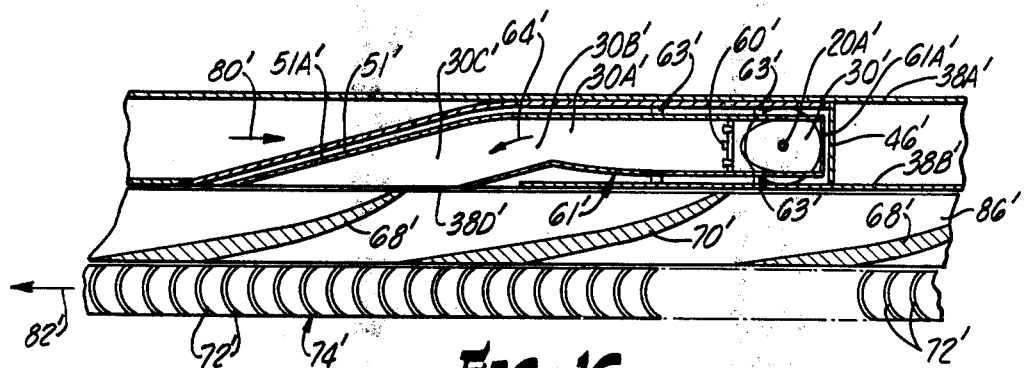
Figure 17:
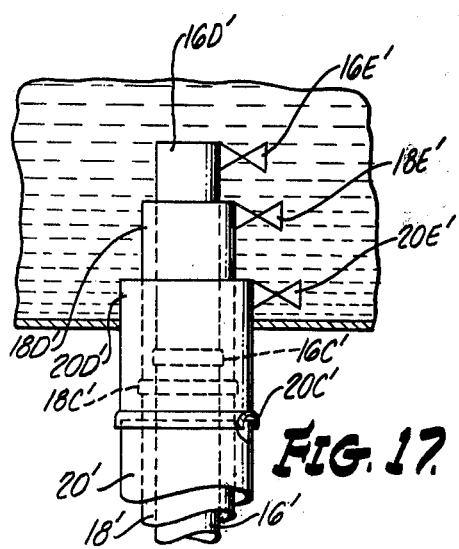
Figures 18, 19:
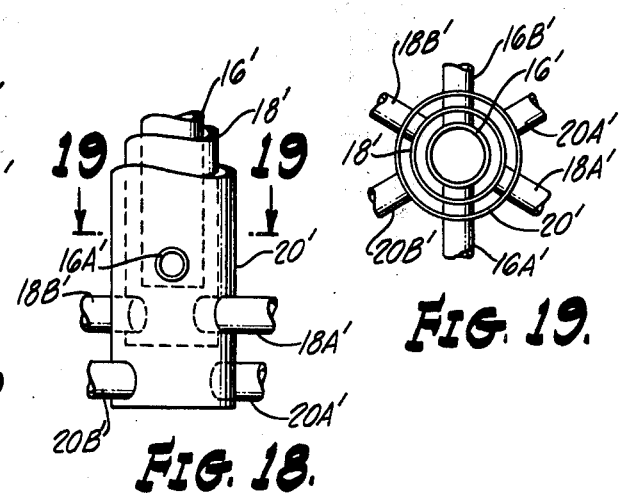

FIG. 13 is a view in elevation of an improved engine embodying features of the present invention with parts broken away to illustrate internal construction;

FIG. 14 is a view taken substantially on line 14—14 of FIG. 13;

FIG. 15 is a view taken substantially on line 15—15 of FIG. 14;

FIG. 16 is a view taken substantially on line 16—16 of FIG. 13;

FIG. 17 is a view in enlarged form of connections near the fuel tank;

FIG. 18 is a view in enlarged form showing fuel lines;

FIG. 19 is a view taken substantially on line 19—19 of FIG. 18 and FIGS. 20 and 21 illustrate modifications;

FIG. 22 is a plan view of another form of the present invention with parts broken away to illustrate internal construction;

FIGS. 23 and 25 are sectional views taken along corresponding lines 23—23 and 25—25 in FIG. 22.

FIG. 24 is a perspective view illustrating air guide means incorporated in the structure shown in FIG. 22.

FIG. 26 is a perspective view illustrating in enlarged form a portion of the apparatus shown in FIG. 22;

FIG. 27 is a view taken substantially as indicated by the lines 27—27 in FIG. 26;

FIG. 28 is a view taken substantially as indicated along the line 28—28 in FIG. 27;

FIG. 29 illustrates in enlarged form a part of the structure shown in FIG. 28;

FIG. 30 is a view taken substantially as indicated by the line 30—30 in FIG. 23.

The engine, as illustrated in FIGS. 1 - 11, involves a rotor 10 having a shaft 12 rotatably supported in spaced bearings 14, 16 in a stationary structure 18 comprising a casing or housing with integrally formed cooling fins 22.

The rotor 10 is of special construction with separate air passages 24, 26 and separate fuel passages 28, 30 therein that extend into a corresponding air-fuel mixing region or chamber 32, 34 thence to combustion chamber 72 where the air-fuel mixture burns to produce a jet of burned fuel at two diametrically spaced regions on the periphery of rotor 10. In some instances only one such jet of burned fuel or more than two may be produced, but is preferred that more than one be produced for attainment of balanced forces.

The drawings illustrate details of only one of the two mixing chambers and outlets in FIG. 3, but it is understood that the other mixing chamber and other outlet is of like construction.

It will be seen that the separate air channels 24, 26 are each, at their inner ends, in communication with a single common air supply through the center of the hollow rotor shaft 12 and that such air channels 24, 26 are each generally of involute configuration and are each of progressively smaller cross section such that rotation of rotor 10 causes the inlet air delivered through channels 24, 26 to be compressed as a result of centrifugal force with attendant rise in temperature. The air thus heated and at higher pressure enters the mixing area illustrated at 34 in FIG. 3 and produces ignition of the fuel being delivered to chamber 34 from fuel chamber 30.

The fuel which may be gasoline, kerosene, alcohol or any other material which burns is sufficiently volatile to burn when sufficient heat is applied thereto is introduced into the rotor channels 28, 30 through corresponding communicating passageways 44, 46 in the rotor shaft 12. Preferably the rotor 10 in cross section is as illustrated in FIG. 2, being thicker at its hub portion and tapering inwardly. The air is heated to a sufficiently high temperature as described previously to cause such fuel to burn as contemplated above.

Preferably a casing 18 is provided for noise suppression and recovery of combustion and waste products, all of which exit from the casing 18 through the exit pipe 60 secured thereto. The casing 18 may be provided with cooling fins 22.

Thus it will be seen that the engine rotor draws air through its hub portion, compresses it by centrifugal force, mixes it with fuel at its periphery and fires such fuel with the heat of the air compressed by the rotor. Compression ratios enable relatively high efficiencies at relatively small weight. A high compression ratio results from the tortuous passageway which is of increasingly smaller cross section and further since high rotational speeds are contemplated, high centrifugal forces are developed producing high pressures and high temperatures at relatively small weight particularly since as mentioned previously, high rotor speeds are contemplated.

Preferably, a flame holder 70 (FIG. 3) consisting of a set of small cones suspended in a lattice, as shown, is located on the downstream side of the mixture chamber 34 within the combustion chamber 72 which may have a reduced cross section in the nozzle section 73 near its outlet 74.

Preferably the rotor is cooled. Also when the rotor is cooled, the heat extracted from the rotor is used to heat cooling water and cause steam to be developed, and such steam is used in developing a torque on the rotor. Thus water may be introduced into the hub of the rotor through water coolant ducts 56, 58 which, of course, rotate with the rotor and which are in communication with water channels 50 in the rotor that surround the air passageways as illustrated in FIG. 5. Such channels 50 at their outer portions extend parallel to the combustion chamber 72 and nozzle portion 74. Another set extends in like manner adjacent to the combustion chamber associated with the mixing chamber 32 at the diametrically opposite portion of the rotor so as to again achieve a balanced condition. The water entering the hub portion of the rotor is progressively heated in its travel through the rotor passageway 50 towards the periphery of the rotor, and in such passage it is converted into steam, and such steam leaving the ends of channels 50 in the nature of steam nozzles and entering the casing 22 provides a jet action that causes an additional torque to be developed on the rotor, thereby increasing the efficiency of the system.

The temperature resulting from the heat of compression may be lowered to achieve more efficient compression by adding water to entering air at the hub.

In the modified construction shown in FIGS. 7–11, like parts have the same reference numerals as in the previous figures. This modified construction is featured by providing one or more additional or supplemental rotors 100, 100A, 100B which are rotatably supported within the common housing 18. Rotor 100 has a series of spaced turbine type buckets 101 against which the jet stream from the rotor 10 impinges to convert energy in such jet stream into energy of rotation in rotor 100. This stream after impinging on blades 101 impinges in succession on blades 101A, 101B of corresponding rotors 100A, 100B after which the energy spent gases may exit through one or more casing openings 18A. Guides (not shown on the drawing) are placed between rotors 100 and 100A and 100A and 100B to assure that the gas enters rotor 100A and 100B at the correct angle. The rotors 100 and 10 as shown thus rotate in the opposite directions in FIGS. 7 and 11 and may rotate at different set speeds depending upon whether or not the two rotors are interconnected in rigid fashion or whether bearings are interposed to allow independent rotation of these two rotors. As illustrated, these two rotors 10, 100 are interconnected by gears for interdependent operation.

As seen in FIGS. 8 and 9, the shaft 112 mounts two gears 120, 121, each of which meshes with a corresponding set 122, 123 of the three gears, each with each gear of each set being rotatably supported internally of casing 18. For example, as seen in FIG. 9, the gear set 123 includes gears 125, 127, 129 rotatably supported on stub shafts 131, 133, 135 projecting from casing 18. These three gears are actually double gears, and each include a corresponding smaller gear 125A, 127A, 129A, each of which is in mesh with gear teeth 141 formed on support member 143 of rotor 100. This rotor 100 has a second like support member 142 which in like manner is geared to the other gear set 122 (like gear set 123).

Rotor 100A is rotatably supported on rotor 100 using two series of double gears 150, 151 which are rotatably supported on casing 18 and serve to interconnect support members 142, 143 or rotor 100 with a corresponding gear 160, 161 (FIGS. 8 and 11) formed on the periphery of corresponding support members 170, 171 of rotor 100A. In like manner a rotor 100B similar to rotor 100A is rotatably supported on rotor 100A using two series of double gears 180, 181, each rotatably supported on casing 18 and serving to interconnect an external gear 182, 183 respectively on corresponding support members 170, 171 with a corresponding internal gear 190, 191 respectively formed on corresponding support member 192, 193 of rotor 100B.

It will be seen that this combination gearing and supporting structure for rotors 100A, 100B allows the same to be rotated in opposite directions. In use as indicated by the arrows 200, 201, 202, 203 in FIG. 8, the main rotor 10 and rotor 100A rotate in the clockwise direction, and rotors 100 and 100B rotate in counter clockwise direction. Preferably there is a change of speed between stages, i.e., rotor 10 rotates at the largest speed of RPM, and rotor 100B rotates at the slowest speed with rotors 100 and 100A rotating at intermediate, but different speeds.

In those cases where independent rotor rotation is desired, the rotors 100, 100A, 100B drive support members 142, 143 as described above; however, in this instance, the large gears in the sets 122, 123 and the two gears 120, 121 on shaft 112 are eliminated. The small gears of these sets 122, 123 remain and one of them is integral with a shaft, similar to stub shaft 131 in FIG. 9, which now projects through casing 18 as illustrated in FIG. 12 and becomes the power takeoff shaft 214 for rotors 100, 100A and 100B.

More specifically as exemplified in FIG. 12, the support member 142 formed with internal gear 142A meshes with gear 223A on an output shaft 214, the shaft 214 being journalled in casing 18.

Referring to the drawings FIGS. 13–19, parts of the engine are mounted to move within and with respect to a casing 10'.

A rotor 11' has its hollow shaft 12' rotatably supported in casing 10' in an upper bearing 14' in FIG. 14 and a second shaft 13' of such rotor 11' is supported in lower bearings 90' and 92'. This shaft 12' is hollow for the introduction of air for combustion and serves also as a conduit for the three concentric fuel lines 16', 18', 20' which are shown in FIG. 14, and also in enlarged form in FIG. 18 wherein it will be noted that there are two branch fuel lines 16A', 16B'; 18A', 18B'; and 20A', 20B', extending radially outwardly from each one of corresponding lines 16', 18', 20' through corresponding radial air conduits 44', 46', 48', 50', 52' and 54' into a corresponding one of six mixture chambers 22', 24', 26', 28', 30', 32'. In these mixture chambers as will be explained later there is a mixture of hot compressed air and fuel which is ignited by the heat of the mixture.

For these purposes it will be seen that the hollow shaft 12' of large internal diameter has secured thereto, as for example, by a weld 34', a multi-piece rotor element 36' of rotor 11' which involves two disc shaped elements 38A' 38B' secured together as for example by a weld 40', and also to shaft 13'. The upper disc shaped ele,ent 38A' in FIG. 14 is apertured to provide apertures for the flow of air through the previously mentioned air channels 44', 46', 48', 50', 52', 54'. The lower disc 38B' is apertured at six locations, 38D' (FIG. 16) to allow flow of the burned fuel.

The hollow shaft 12' has secured thereto these six radially extending air conduits 44', 46', 48', 50', 52' and 54' in the nature of hollow spokes which have their inner ends in communication with hollow shaft 12' through a corresponding one of six apertured portions 56' near the inner end of shaft 2'. It will be seen that previously mentioned fuel lines 16A', 16B', 18A', 18B'; and 20A', 20B' pass through a corresponding one of such apertured portion 56' and through a corresponding one of such hollow spokes or air conduits 44'–54' to a corresponding one of such mixing chambers 22'–32'. These fuel lines 16A'–20B' each terminate as illustrated in FIG. 16 at the outer end of the corresponding air channel 44'–54' in an air-fuel mixture chamber and in front of a corresponding flame holder 60'. The fuel ignited by the heated air appears as a flame in the corresponding adjacent combustion chamber 22A'–32A' with the gases passing in the direction indicated by the arrow 64' in FIG. 16 between stationary guide members 68', 70' onto bucket elements 72' of a rotor 74' to produce a rotation of the rotor 11' to the right in FIG. 16 and a rotation of the rotor 74' to the left in FIG. 16 as indicated respectively by arrows 80' and 82'.

The series of stationary guides 68', 70' are suitably secured in a frame 86' which is suitably secured to the stationary casing 10'. This frame 86' also provides a support or retainer for a bearing 90' which provides a bearing surface for rotor shaft 13' as well as the rotor turbine bucket rotor 74' which rotates about shaft 13'.

The circular stationary frame member 96' has a peripheral portion spaced from casing 10' to provide an annular opening for gases leaving the turbine blades 72' in the axial or side direction as indicated by the arrows 102' in FIG. 14.

Mounted for rotation on this stationary plate 96' are three gears 110', 112', 114' each of which are in mesh with the gear 116' secured to turbine rotor 74' and one of these gears 114' has a protruding output shaft 114A' serving as the power output shaft of the turbine bucket rotor 74'.

The fuel lines 16', 18', 20' as shown in FIG. 17 are connected through corresponding leak proof swivel connections 16C', 18C', 20C' to the lower ends of stationary tubes 16D', 18D', 20D' which extend upwardly through stationary fuel tank 21'. Associated with each of such tubes 16D', 18D', 20D' are corresponding adjustable valves 16E', 18E', 20E' through which the fuel flows in adjusted quantities.

It will be seen in FIG. 16 that each combustion chamber represented by the combustion chamber 30A' has a downstream restricted portion 30B' serving generally as a nozzle portion and that such portion 30C' which is further downstream may be referred to as the exhaust chamber 30C'. The gases leave this exhaust chamber 30C' and travel through the disc apertured portion 38D' and a stationary guide structure before impinging on the turbine buckets 72' as previously described.

Further, referring to FIG. 16 it will be noted that there is provided a duct 51' which extends generally parallel with and in heat connection with respect to the flow of the combustion products. Such duct 51' may have supplied thereto cooling air for cooling such combustion products. Indeed the inner wall 51A' of duct 51' may be porous so as to allow passage of some of the cooling air therethrough to mingle with the combustion products to reduce their temperature and in some cases for increased efficiency.

It is further observed that the peripheral edge portions of discs 38A', 38B' are joined by a circumferentially extending continuous half round tube 38F' for rigidity and to retain and support the six modified tubes represented by modified tube 61' containing flame holder 60' in FIG. 16 which as seen in FIG. 16 includes the mixing chamber 30' and associated combustion chamber 30A' nozzle portion 30B' and exhaust chamber 30C'. This modified tube 61' is secured as a unit to peripheral portions of disc like elements 38A', 38B' and the circumferentially extending half tube 38F' using a series of cleat spacers 63' which space the modified tube 61' from these peripheral edges of discs 38A', 38B' and their joining half tubular portion 38F' while yet allowing air to pass through a generally annular space which defines the air channel or duct 51'. This tube 61' has a closed end portion 61A' and such tube 61' is apertured to allow most of the air to enter the mixing chamber 30' from the corresponding radially extending air ducts 44'–54'. A portion of the wall of such air ducts as represented by the air duct 46' in FIG. 16 extends between and is secured to the peripheral disc portions 38A', 38B' and connecting circumferentially half tube 38F' and with wall 61A' forms a part of the air duct 51'.

Further as illustrated in FIG. 20 a water cooling system may be employed for cooling of the radially extending air ducts 44', 46', 48', 50', 52' amd 54' as well as cooling of the combustion chamber. For this latter purpose water ducts 102', 103' may be incorporated as an integral part of the wall structure of the metal defining each of such radial arm ducts 44'–54' with the outer ends of such water ducts terminating in a coil 104' which encircles the combustion chamber. In such case the coil 104' has its opposite ends connected to the outer ends of the pair of water ducts 102', 103' in a corresponding one of the air conduits 44'–54' and with the inner ends of each pair of water ducts 102', 103' being in connection with a heat dissipating radiator 106'. It is considered that in such case no pump is necessary since the water from the cooling radiator 106' shall then be urged outwardly by centrifugal force through the coil 104' around the combustion chamber and be returned to the radiator 106' for cooling.

In FIG. 21 the air supplied to the combustion chambers may be controlled using six adjustable valves arranged in three pairs of two valves all arranged at the inlet to a corresponding one of the air channels 44'–54'. The entrance to these air channels are formed as valve seats having corresponding numerals with a characteristic letter A appended thereto. Thus, for example, air channel 46' has a valve seat 46A' and channel 52' has a valve seat 52A' cooperating respectively with a corresponding moveable valve element 46B', 52B' which may be moved up or down in FIG. 21 to control the effective opening of the air channels.

For example, valve elements 46B', 52B' for that purpose have control rods 46C', 52C' attached thereto with one each of each being connected to a disc 200'. The disc 200' is loosely fitted and supported in spaced flanges of the cylinder portion 202C' piston-cylinder actuators 202' each of which have its corresponding piston portion 202P' stationarily connected, for example, to the fuel tank base portion 206'. Thus when the piston cylinder combinations 202' are actuated by applying fluid under pressure to the same in conventional manner the valve elements 46B', 52B' are moved up or down as desired to increase or restrict the flow of air to the combustion chamber.

This construction is repeated as shown in FIG. 21 with respect to the other moveable valve elements and in that regard it will be noted that disc 200' is apertured at 200A', 200B' to allow passage for like control rods 44C' and 54C' which likewise are connected to corresponding disc plates 230', 240' which in turn are supported and controlled in position by like piston-cylinder actuators 232', 242'.

It will also be observed that in order to reduce frictional effects due to turbulence and the like a conical type shroud 55' (FIG. 21) covers the arms 44'–54' so as to in effect streamline the same since high rotational speeds are contemplated.

It will be seen that this construction involves the following important features. This construction involving radial air conduits contributes to a simple, compact design. The novel teaching herein that the air ducts may extend radially increases the possibility of using a great number of such ducts instead of a limited number of tortuous or volute passageways. The construction lends itself to easier manufacture. Also individualized control of fuel and/or air is now incorporated to achieve flexibility in operation taking into account the fact that adjustments may now be made to achieve higher efficiencies at various load levels, i.e., the engine may be easily adjusted or adapted to supply the required fuel and/or air for greater efficiency at any power output or load. Also it will be noted that the rotor involves two disc like elements 38A', 38B' secured together with one of such disc like elements being apertured at the six locations 38E' near the periphery of disc 38A' to allow passage therethrough of the six air conduits and that these disc like elements are thicker at the center than at their peripheral portions, all of which contributes to manufacturing advantages, compactness and large ratio of horsepower output to weight with higher speed operation being permitted for comparable materials. Further water cooling may be achieved without loss of water. Water cooling may be used without lowering the temperature of exhaust gases for increased efficiency. The construction also is efficient in effecting an air cooling in those instances where water cooling is not used. An additional feature is the use of small fuel tubes which are placed within the large air conduits as separate entities. Further, the construction permits the use of a shroud for reduction of windage and air friction losses particularly at high speeds without however requiring a shroud for the low disc like element 38B'. Further the axially directed exhaust in contrast to for example, a radial exhaust from the reaction turbine impedes the rotor less, particularly at reduced power.

While the drawings illustrate an engine with six radial combustion supporting air conduits, a greater or lesser number may be used as desired but it is preferred that the number be an even number and spaced to achieve balanced forces. Further, while the jet engine is illustrated as having a restricted portion 30B' in some cases this may not be necessary or desirable in which case the combustion chamber is generally of the same cross section or may be tapered outwardly as may be desired.

As noted previously precompression of the air prior to its entering hollow shaft 12' may be desired. This may be accomplished for example by mounting the rotor of a conventional centrifugal compressor 250' directly on shaft 12'.

The engine illustrated in FIGS. 22–30 is essentially the same as that one described in FIGS. 13–21 and hence corresponding parts are designated by the same reference numerals. Certain new features have been added namely; air vanes 330 in FIG. 24 to achieve a streamlined flow of air; an improved supporting arrangement for the combustion chamber illustrated in FIG. 26; and a somewhat different manner of interconnecting the two rotors to the same common output shaft 13' about which they rotate.

As seen in FIG. 24 guide plates 330, curved at their upper ends 330A are interposed in the shaft 12' to direct the combustion chamber to a corresponding one of the radially extending air ducts so that minimum resistance to air flow is accomplished in that region.

The combustion chamber is supported in FIG. 26 using a structure fastened to the jet propelled rotor 36' and this structure involves a backing plate 313 to which a series of webs 311 that encircle and are joined to the outer wall 316 of the double wall combustion chamber defined by the inner wall 317 and outer wall 316 spaced therefrom by a series of cleats 320 which define air passageways between the walls 316, 317. As indicated in FIG. 27 some of the incoming air may flow not only to the combustion chamber for burning of the fuel but also some of the air may flow, for cooling purposes, through the air channels defined by spaced cleats 320. This air as shown in FIG. 29 may subsequently enter the combustion chamber through apertured portions 317A downstream of the flame holder 60' and the products of combustion exhaust through the opening 322 onto the turbine blades 72'.

The common output shaft 13' about whose axis the jet propelled rotor and the turbine rotor revolve are coupled using gearing illustrated in FIGS. 23 and 30. The turbine rotor assembly 303 (corresponding to 74' in FIG. 14) is formed with an internal gear 305 and gear 300 is keyed on shaft 13' with thru idler gears 301 between the same. These gears 301 rotate on stub shafts 302 secured to the stationary structure 96'. Thus the energy from the two rotors rotating in opposite directions is coupled to the common output shaft 13'.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:
1. A jet type engine including:
   a. a rotor of full circular form having an output shaft rotatable about an axis;
   b. a combustion chamber near the periphery of said rotor;
   c. a combustion supporting fluid passageway in said rotor extending from an inner portion of said rotor to said combustion chamber, and a fuel channel in said rotor extending to said combustion chamber, there being means whereby rotation of said rotor causes the combustion supporting fluid in said pas- sageway to be compressed and heated prior to entering said combustion chamber;

d. a jet channel in said rotor in communication with said combustion chamber to exhaust the burned fuel from said combustion chamber and produce a jet reaction, the burning of said fuel being produced at least in part as a result of the heating of said combustion supporting fluid in its passage through said passageway;

e. a turbine structure rotatably supported about said axis and including means against which said burned fuel impinges to rotate said turbine structure; and f. means to prevent said turbine structure from rotating as fast as said rotor.

2. A combination as defined in claim 1 in which said turbine structure rotates in a direction opposite to that in which said rotor rotates, and in which the last-named means of claim 29 constitutes a means coupling said turbine structure to said output shaft such that energy from both said rotor and said turbine structure is delivered to said output shaft in the same direction of rotation.

3. An engine as set forth in claim 1 in which said passageway is of decreasing cross-sectional area as it extends away from the rotational axis of said rotor.

4. An engine as set forth in claim 1 including a jet nozzle portion at the periphery of said full circle rotor and adjacent to and in communication with said combustion chamber, and a flame holder in said combustion chamber forming a part thereof into a mixing chamber.

5. A jet type engine as set forth in claim 1 including coolant passage means extending through said rotor and in heat conducting relationship to said passageway and terminating near the periphery of said rotor for producing vapor and a jet reaction at said periphery by said vapor leaving said coolant passage means.

6. A jet type engine as set forth in claim 1 including means whereby a coolant is added to the combustion supporting fluid.

7. An engine as set forth in claim 1 including means whereby said combustion supporting fluid is heated sufficiently in its travel through said fluid passageway to cause burning of said fuel in said combustion chamber without an auxiliary igniting means.

8. A jet type engine including;
a. a rotor of full circular form;
b. means in said rotor defining a combustion chamber near the periphery of said rotor;
c. a combustion supporting fluid passageway in said rotor extending radially from an inner portion thereof to said combustion chamber, and a fuel channel in said rotor extending to said combustion chamber, rotation of said rotor causing the combustion supporting fluid in said passageway to be compressed and heated prior to entering said combustion chamber;
d. means defining a jet channel in and near the periphery of said rotor in communication with said combustion chamber to exhaust the burned fuel and produce a jet reaction; and
e. said rotor incorporating two fully-circular disc-like elements each having a thickened center portion and tapering radially outwardly, one of said disc-like portions being apertured near its periphery with said fluid passageway extending therethrough.

9. An engine as set forth in claim 8 in which said passageway extends to the exterior of said rotor and is enclosed by a streamlined shroud.

10. A jet engine as set forth in claim 8 in which a space between said disc-like elements forms a part of said combustion supporting passageway.

11. A jet engine as set forth in claim 8 in which said disc-like elements have spaced peripheral edge portions, a tube-like structure secured to said peripheral edge portions and defining said combustion chamber, said tube-like structure having a restricted cross-sectional portion defining a nozzle portion.

12. An engine as set forth in claim 8 in which the other one of said disc-like elements is apertured near its periphery to allow the flow of burned fuel.

13. An engine as set forth in claim 11 in which a circumferentially extending half-tube extends between adjacent peripheral edge portions of said disc-like elements and said tube-like structure is spaced from said peripheral edge portions and said circumferentially extending half-tube to define a generally annular space for coolant means.

14. A jet type engine including:
a. a rotor of full circular form;
b. means in said rotor defining a combustion chamber near the periphery of said rotor;
c. a combustion supporting fluid passageway in said rotor extending radially from an inner portion thereof to said combustion chamber, and a fuel channel in said rotor extending to said combustion chamber, rotation of said rotor causing the combustion supporting fluid in said passageway to be compressed and heated prior to entering said combustion chamber;
d. means defining a jet channel in and near the periphery of said rotor in communication with said combustion chamber to exhaust the burned fuel and produce a jet reaction;
e. there being a plurality of pairs of combustion chambers, passageways, fuel channels and jet channels; and
f. means for separately adjusting the flow of fuel through said different pairs of fuel channels.

15. An engine as set forth in claim 14 in which there is adjusting means for adjusting the flow of combustion supporting fluid through said fluid passageway includes a central hollow shaft through which said fluid flows into said fluid passageway, the interior of said hollow shaft being formed as a valve seat, and a valve element movable with respect to said valve seat.

16. An engine as set forth in claim 14 in which said fuel flow adjusting means includes concentric fuel tubes, valve means near the ends of said fuel tubes, a hollow shaft forming a shaft for said rotor, said concentric fuel tubes extending concentrically through said hollow shaft, and a plurality of outwardly extending second fuel tubes, each having one of its ends in communication with a corresponding one of said concentric fuel tubes and the other one of its ends in communication with one of said combustion chambers.

17. A jet type engine including:
a. a rotor of full circular form;
b. means in said rotor defining a combustion chamber near the periphery of said rotor;
c. a combustion supporting fluid passageway in said rotor extending radially from an inner portion thereof to said combustion chamber, and a fuel channel in said rotor extending to said combustion chamber, rotation of said rotor causing the combustion supporting fluid in said passageway to be compressed and heated prior to entering said combustion chamber;

d. means defining a jet channel in and near the periphery of said rotor in communication with said combustion chamber to exhaust the burned fuel and produce a jet reaction; and e. additional continuously open conduit means extending from said fluid passageway for delivering the combustion supporting fluid as a coolant to mix with said burned fuel, said additional conduit means being positioned in heat conducting relationship to said combustion chamber and to an exhaust nozzle in communication with said combustion chamber.

18. A jet type engine including:

a. a rotor of full circular form;

b. means in said rotor defining a combustion chamber near the periphery of said rotor;

c. a combustion supporting fluid passageway in said rotor extending radially from an inner portion thereof to said combustion chamber, and a fuel channel in said rotor extending to said combustion chamber, rotation of said rotor causing the combustion supporting fluid in said passageway to be compressed and heated prior to entering said combustion chamber;

d. means defining a jet channel in and near the periphery of said rotor in communication with said combustion chamber to exhaust the burned fuel and produce a jet reaction;

e. turbine means rotatably supported for rotation about the same axis as said rotor, said burned gases which exhaust from said rotor being directed axially thereunto; and f. means to prevent said turbine means for rotating as fast as said rotor.

19. A jet type engine including:

a. a rotor of full circular form;

b. means in said rotor defining a combustion chamber near the periphery of said rotor;

c. a combustion supporting fluid passageway in said rotor extending radially from an inner portion thereof to said combustion chamber, and a fuel channel in said rotor extending to said combustion chamber, rotation of said rotor causing the combustion supporting fluid in said passageway to be compressed and heated prior to entering said combustion chamber;

d. means defining a jet channel in and near the periphery of said rotor in communication with said combustion chamber to exhaust the burned fuel and produce a jet reaction; and e. there being a reinforcing means for said combustion chamber which consists of a backing plate and a plurality of webs secured to said backing plate positioned inwardly of said combustion chamber and at least partly encircling said combustion chamber.

20. A jet type engine including:

a. a rotor of full circular form having an output shaft rotatable about an axis;

b. a combustion chamber near the periphery of said rotor;

c. a combustion supporting fluid passageway in said rotor extending from an inner portion of said rotor to said combustion chamber, and a fuel channel in said rotor extending to said combustion chamber, there being means whereby rotation of said rotor causes the combustion supporting fluid in said passageway to be compressed and heated prior to entering said combustion chamber;

d. a jet channel in said rotor in communication with said combustion chamber to exhaust the burned fuel from said combustion chamber and produce a jet reaction, the burning of said fuel being produced at least in part as a result of the heating of said combustion supporting fluid in its passage through said passageway;

e. a turbine structure rotatably supported about said axis and including means against which said burned fuel impinges to rotate said turbine structure; and f. means coupling said turbine structure to said output shaft such that energy from said turbine structure is delivered to said output shaft in the direction of rotation of said output shaft, said last named means including a ring gear driven by said turbine structure, a pinion gear on said output shaft, and planetary gear means intermeshing between said ring gear and said pinion gear, said gearing causing said turbine structure to rotate slower than said rotor.

* * * * *

UNITED STATES PATENT OFFICE
CERTIFICATE OF CORRECTION

Patent No. 4,024,705          Dated May 24, 1977

Inventor(s) Lewis W. Hedrick

It is certified that error appears in the above-identified patent and that said Letters Patent are hereby corrected as shown below:

Column 11, line 18, for "29" read --1--.

Signed and Sealed this

Fourth Day of October 1977

[SEAL]

Attest:

RUTH C. MASON
Attesting Officer

LUTRELLE F. PARKER
Acting Commissioner of Patents and Trademarks